(3,053,872)

PROCESS FOR PREPARING BIS-SILYLARYLENE COMPOUNDS

George M. Omietanski, Grand Island, N.Y., assignor to Union Carbide Corporation, a corporation of New York
No Drawing. Filed Dec. 30, 1957, Ser. No. 705,773
5 Claims. (Cl. 260—448.2)

This invention relates to a new and improved process for producing bis-silylarylene compounds. More particularly, this invention relates to a new and improved Grignard-type method for producing compounds of the general formula:

1. $(X)_n(R)_{3-n}\text{—Si—R'—Si—}(R)_{3-n}(X)_n$ wherein R stands for a monovalent hydrocarbon radical, such as methyl, propyl, vinyl, allyl, ethyl, cyclohexenyl, phenyl, methylphenyl, dimethylphenyl and the like (it is to be understood that the group R need not be the same throughout the molecule); R' stands for a divalent arylene radical, such as 1,4-phenyl, 1,3-phenyl, 4,4'-diphenyl, 1,5-naphthalene and the like, an alkyl-substituted arylene radical, such as 2,5-p-xylene and the like, or a diarylene ether radical, such as 4,4'-diphenyl ether and the like; X stands for a halogen, alkoxy, phenoxy, or alkyl-substituted phenoxy radical, such as methylphenoxy and the like; and n stands for an integer having a value of from 0 to 2.

The preparation of bis-silylarylene compounds of the above general formula by a Grignard-type method is known in the art. Such method generally involves synthesizing a difunctional Grignard reagent in the presence of an ethyl ether solvent from a dibromoarylene or diiodoarylene, and reacting the intermediate Grignard reagent with a silane of the general formula:

2. $X_mSiR_{4-m}$ where R and X are as above defined in general Formula 1, and m is an integer having a value of from 1 to 3. This may be illustrated, in the case of 1,4-dibromobenzene and dimethyldichlorosilane, by the following graphic equation:

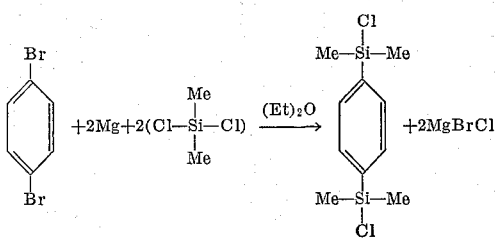

The known practicable methods for preparing bis-silylarylene compounds by the above-illustrated Grignard synthesis make use of a dibromoarylene or diiodoarylene as starting material rather than the corresponding, less-costly, and more readily available dichloroarylene because of the recognized inactivity of the second chloride radical of a dichloroarylene compound in a Grignard-type synthesis. Thus, known attempts to couple a dichloroarylene compound with a silane of general Formula 2 in a Grignard-type synthesis by effecting reaction in an ethyl ether solvent result in the formation of only relatively small amounts of the "bis" compound even when long reaction times are employed. Consequently, making bis-silylarylene compounds by using a dichloroarylene has heretofore been impracticable and commercially unacceptable.

I have now discovered that the second chloride radical of an aromatic dichloride is considerably more reactive toward silanes of general Formula 2 in a Grignard-type synthesis if the reaction is carried out in the presence of tetrahydrofuran. Thus, in accordance with my invention, a dichloroarylene compound may be more readily coupled with a silane of general Formula 2 in a Grignard-type synthesis by effecting reaction in the presence of tetrahydrofuran. Indeed, when tetrahydrofuran is employed as solvent, not only are substantially larger yields obtained, but they are obtained over a much shorter reaction time than is required when using diethyl ether.

The present invention is based on my discovery that bis-silylarylenes may be produced from dichloroarylene compounds in substantially increased yields and shortened reaction periods by effecting reaction between said dichloroarylene and a silane of general Formula 2, in the presence of magnesium and tetrahydrofuran. Although I do not wish to be bound by any one theory, it is believed that a difunctional Grignard reagent is formed in situ which immediately reacts with the silane to produce the desired bis-silylarylene compound. In effect, the bis-silylarylene is produced by removing chlorine atoms from the dichloroarylene and X radicals (see general Formula 2) from the silane, thereby effecting coupling at the points of removal. This may be illustrated, in the case of 1,4-dichlorobenzene and dimethyldichlorosilane, by the following graphic equation:

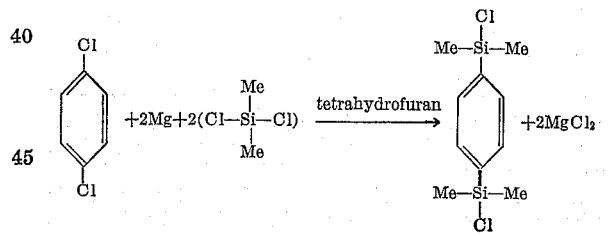

It will be obvious to those skilled in the art that my process may also be used to effect coupling between a mono-silylchloroarylene-type compound, such as p-dimethylchlorosilylchlorobenzene, and a silane of general Formula 2. Thus, one may first prepare a monosilylchloroarylene-type compound by any of the methods known in the art, and then effect coupling with a silane of general Formula 2 by heating in the presence of magnesium and tetrahydrofuran. In this manner, a wide variety of bis-silylarylene compounds containing differing silyl radicals may be synthesized. (It is also believed that dissimilar silyl groups can be added to the same arylene be employing different silanes in the same reaction.) This may be illustrated by the following graphic equations showing the stepwise synthesis of 1-dichloromethylsilyl-4-chlorodimethylsilyl benzene:

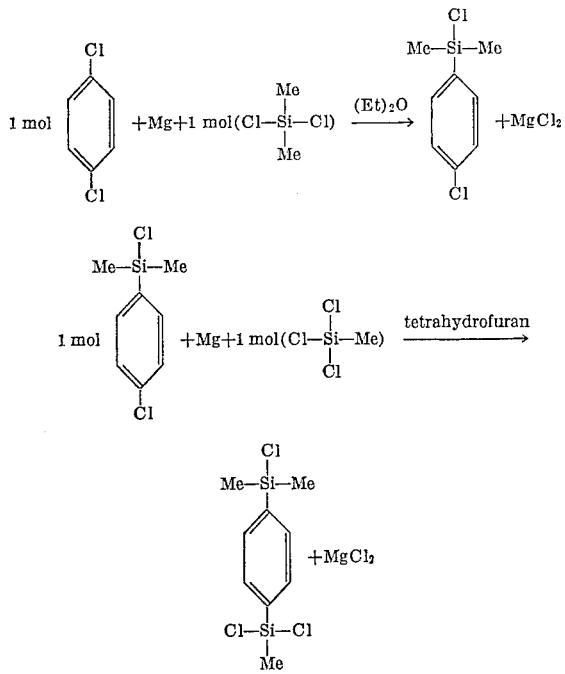

I prefer to effect reaction by admixing a silane of general Formula 2, magnesium, and tetrahydrofuran, heating the mixture to its refluxing temperature, and gradually adding thereto a suitable dichloroarylene dissolved in tetrahydrofuran, while continuing to reflux the mixture in order to effect the desired coupling to produce a bis-silylarylene compound. If necessary, an iodine crystal and a small amount of a 1,4-dibromoarylene compound may be added in order to initiate reaction. The preferred method of carrying out my invention may be illustrated by Example III.

The dichloroarylene compounds which may be employed in the process of my invention are those of the general formula Cl—R'—Cl, in which R' stands for a divalent arylene radical, such as 1,4-phenyl, 1,3-phenyl, 4,4'-diphenyl, 1,5-naphthalene and the like, an alkyl-substituted arylene radical, such as 2,5-p-xylene and the like, or a diarylene ether radical such as 4,4'-diphenyl ether and the like. It will, of course, be obvious to those skilled in the art that either one of the chlorine atoms of the dichloroarylene employed as starting materials in the process of my invention may be replaced by a bromine or iodine atom.

The silanes which may be employed in the process of my invention are those of the general formula $X_mSiR_{4-m}$, wherein R stands for a monovalent hydrocarbon radical, such as methyl, ethyl, vinyl, allyl, cyclohexyl, phenyl, methylphenyl, propyl dimethylphenyl and the like (it is to be understood that the group R need not be the same throughout the molecule); X stands for a halogen, alkoxy, phenoxy, or alkyl-substituted phenoxy radical such as methylphenoxy and the like; and m stands for an integer having a value of from 1 to 3.

Since two moles of silane combine with one mole of dichloroarylene to produce one mole of bis-silylarylene, two moles of silane should be employed in the reaction per mole of dichloroarylene used. In practice, it is preferable to employ the silane in an amount ranging from the stoichiometric equivalent to a one-mole excess. Greater amounts of silane may also be employed; however, no commensurate value is obtained thereby.

Since two moles of silane combine with one mole of dichloroarylene to produce one mole of bis-silylarylene, two moles of magnesium should be employed in the reaction per mole of dichloroarylene used. In practice, it is preferable to employ magnesium in an amount ranging from the stoichiometric equivalent to a one mole excess. Greater amounts of magnesium may also be employed; however, no commensurate value is obtained thereby.

The magnesium metal employed is preferably employed in a form so as to provide a maximum of surface to facilitate reaction. Thus we prefer to employ magnesium in the form of powder or turnings.

The temperature at which coupling between a dichloroarylene compound and a silane of general Formula 2 may be caused to occur is not narrowly critical and may vary widely. In general, temperatures between 50° C. and 200° C. may be employed. The preferred temperature is the refluxing temperature of the mixture. Temperature above or below the refluxing temperature of the mixture, and above and below the broadly disclosed range, may also be advantageously employed; however, no commensurate value is obtained thereby.

The pressure employed in the process of my invention is not narrowly critical and may vary widely. As a practical matter, it is preferable to employ atmospheric pressure. Pressures both above and below atmospheric pressure may be advantageously employed; however, no commensurate value is obtained thereby.

The bis-silylarylene compounds produced in accordance with my process may be employed to produce modified elastomers, oils, resins, and fibers. Specifically, thermally stable elastomers possessing superior physical properties can be prepared by introducing 1,4-(dimethyloxasilyl)-benzene units into dimethyl silicones, and modified silicone oils can be prepared by introducing 1-trimethylsilyl-4-dimethyloxasilyl-benzene units into dimethyl silicones. Fibers can be obtained by the homopolymerization of 1,4-(dimethylhydroxysilyl)benzene, 4,4'-(dimethylhydroxysilyl)biphenyl, or 4,4'(dimethylhydroxysilyl)phenyl ether. A viscous, "solventless" resin readily curable to the solid state may be obtained by the preferential hydrolysis and condensation of 1-diethoxymethylsilyl-4-ethoxydimethylsilyl benzene as disclosed in U.S.P. 2,709,692. When only hydrocarbon radicals are attached to silicon, these bis-silylarylene compounds are useful as high temperature lubricants.

*Example I*

*The Grignard Reaction of 1,4-Dichlorobenzene With Dimethyldichlorosilane in Ethyl Ether*

In a 5-liter, 3-necked, round-bottom flask, equipped with a stirrer, dropping funnel, reflux condenser, and a nitrogen inlet and outlet were placed 170 grams of magnesium turnings (7 moles) 850 ml. of dry ethyl ether, and 903 grams of dimethyldichlorosilane (7 moles). The mixture was heated to reflux under a nitrogen atmosphere. Reaction was initiated with 15 grams of 1,4-dibromobenzene. The mixture was maintained at reflux by external heating as a solution of 441 grams of 1,4-dichlorobenzene (3 moles) in 650 ml. of ethyl ether was added drop-wise over a period of 4 hours. Since very little reaction had occurred at this point, the mixture was heated at reflux for an additional 26 hours. The reaction mixture was then cooled, filtered, and stripped of low boiling constituents. Vacuum distillation of the residue yielded 238 grams of p-ClC$_6$H$_4$SiMe$_2$Cl (B.P.=92–94° C. at about 5 mm. Analysis: 46.8 percent C, 4.9 percent H, 13.7 percent Si) and 177 grams of p-(Me$_2$SiCl)$_2$C$_6$H$_4$ (B.P.=105–110° C. at about 1 mm. Analysis: 45.6 percent C, 6.1 percent H, 21.3 percent Si).

EXAMPLE II

*The Grignard Reaction of 1,4-Dichlorobenzene With Dimethyldiethoxysilane in Tetrahydrofuran*

In a 2-liter, 3-necked, round bottom flask, equipped with stirrer, reflux condenser, dropping funnel, and nitrogen inlet and outlet, were placed 73 grams of magnesium turnings (3 moles) and 500 ml. of dry tetrahydrofuran.

An iodine crystal and 7.1 grams of 1,4-dibromobenzene was added for initiating the reaction. The mixture was heated to reflux and a solution of 147 grams of 1,4-dichlorobenzene (1 mole) and 444.7 grams of dimethyldiethoxysilane (3 moles) was slowly added over a period of 3 hours. After the addition had been completed, the mixture was heated at reflux for an additional 5 hours. The reaction mixture was then cooled, filtered, and the salt-cake extracted with ethyl ether. The ether extract was combined with the filtrate and the combined liquids were stripped of solvent at atmospheric pressure. Vacuum distillation of the residue yielded 55.5 grams of 1,4($Me_2SiOEt$)$_2C_6H_4$; B.P.=90–93° C./0.05 mm., $$n_D{}^{25}=1.4759$$

Analysis: 59.0 percent C, 9 percent H, 19.8 percent Si.

EXAMPLE III

*The Grignard Reaction of 1,4-Dichlorobenzene With Dimethyldichlorosilane in Tetrahydrofuran*

In a 5-liter apparatus similar to that of Example I, were placed 170 grams of magnesium turnings (7 moles), 400 ml. of tetrahydrofuran, and an iodine crystal. Reaction was initiated upon the addition of 10 grams of 1,4-dibromobenzene and 20 grams of dimethyldichlorosilane. An additional 1000 ml. of tetrahydrofuran and 903.3 grams of dimethyldichlorosilane were then added (7 moles total amount of dimethyldichlorosilane added). The mixture was heated to reflux and a solution of 441 grams of 1,4-dichlorobenzene (3 moles) in 600 ml. of tetrahydrofuran was slowly added over a period of 4 hours. Since the reaction was self-sustaining, the source of heat was withdrawn. After the addition had been completed, heat was applied and the mixture heated at reflux for an additional 2 hours. The reaction mixture was then cooled, a liter of dry benzene added, and the combined mixture filtered. The salt cake was extracted with benzene, the extract combined with the filtrate, and the combined liquids stripped of solvent at atmospheric pressure. Vacuum distillation of the residue yielded 317 grams of $$1,4(Me_2SiCl)_2C_6H_4$$

B.P.=110° C./1.5 mm. Analysis: 45.7 percent C, 6.1 percent H, 20.7 percent Si.

EXAMPLE IV

*The Basic Hydrolysis of 1,4($Me_2SiCl$)$_2C_6H_4$ to 1,4($Me_2SiOH$)$_2C_6H_4$*

Seventy-six grams of 1,4($Me_2SiCl$)$_2C_6H_4$ (0.29 moles) were dissolved in 350 ml. of ethyl ether. This solution was added over a period of 1 hour with rapid stirring to a mixture of 500 ml. of concentrated ammonium hydroxide and 500 ml. of crushed ice in a 3-liter flask. Stirring was continued until the mixture had attained a temperature of 25° C. The ether layer was then separated and the ether removed under reduced pressure. The residue was recrystallized from benzene. There was obtained 45 grams of 1,4($Me_2SiOH$)$_2C_6H_4$; M.P.=139° C.–140° C. Analysis: 53.5 percent C, 7.4 percent H, 24.5 percent Si.

EXAMPLE V

*Preparation of p-Cl—$C_6H_4SiMe_2Cl$*

In a 3-liter, 3-necked flask equipped with stirrer, dropping funnel, and reflux condenser, were placed 73 grams of magnesium (3 moles) and 250 ml. of tetrahydrofuran. Reaction was initiated with 0.2 gram of iodine and 10 grams of 1,4-dibromobenzene. An additional 500 ml. of tetrahydrofuran were added, the mixture heated to reflux, and a solution of 147 grams of 1,4-dichlorobenzene (1 mole) in 250 ml. of tetrahydrofuran rapidly added thereto. Towards the end of the addition, the reaction became self-sustaining. After the addition had been completed, heat was applied and the mixture heated at reflux for an additional 2 hours. The reaction was run under a nitrogen atmosphere. The reaction mixture was then cooled and filtered to free it from the unreacted magnesium. The filtrate was then slowly added to a solution of 400 grams of dimethyldichlorosilane in 500 ml. of tetrahydrofuran. There was no apparent heat of reaction. After the addition had been completed, the mixture was then heated at reflux for 6 hours. The reaction mixture was then cooled, filtered, and stripped of solvent. Vacuum distillation of the residue yielded 161 grams of p-$ClC_6H_4SiMe_2Cl$; B.P.=78–83° C./3 mm., $n_D{}^{25}$=1.5187. Analysis: 46.2 percent C, 5.0 percent H, 13.7 percent Si.

What is claimed is:

1. A process for preparing bis-silylphenylene compounds of the general formula:

wherein R is a monovalent hydrocarbon radical; R' is a member selected from the group consisting of phenylene radicals and alkyl-substituted phenylene radicals; X is a member selected from the group consisting of halogen, alkoxy, phenoxy, and alkyl-substituted phenoxy radicals; and $n$ is an integer having a value of from 0 to 2; which comprises forming a mixture of a silane of general formula $X_mSiR_{4-m}$, wherein R and X are as above defined, and $m$ is an integer having a value of 1 to 3, a dichlorophenylene compound of general formula Cl—R'—Cl, wherein R' is as above defined, and magnesium in tetrahydrofuran, and heating the mixture to effect reaction between said silane, dichlorophenylene compound and magnesium to produce said bis-silylphenylene compound, and separating said compound.

2. A process for preparing bis-silylphenylene compounds of the general formula:

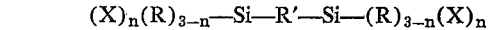

wherein R is a monovalent hydrocarbon radical; R' is a member selected from the group consisting of phenylene radicals and alkyl-substituted phenylene radicals; X is a member selected from the group consisting of halogen, alkoxy, phenoxy, and alkyl-substituted phenoxy radicals; and $n$ is an integer having a value of from 0 to 2; which comprises admixing magnesium and tetrahydrofuran, heating the tetrahydrofuran to its refluxing temperature, gradually adding a mixture of a silane of general formula $X_mSiR_{4-m}$, wherein R and X are as above defined, and $m$ is an integer having a value of 1 to 3, and a dichlorophenylene compound of general formula Cl—R'—Cl, wherein R' is as above defined, and continuing to heat the mixture to effect reaction between said silane, dichlorophenylene, and magnesium to produce said bis-silylphenylene compound, and separating said compound.

3. A process for preparing bis-silylphenylene compounds of the general formula:

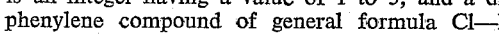

wherein R is a monovalent hydrocarbon radical; R' is a member selected from the group consisting of phenylene radicals and alkyl-substituted phenylene radicals; X is a member selected from the group consisting of halogen, alkoxy, phenoxy, and alkyl-substituted phenoxy radicals; and $n$ is an integer having a value of from 0 to 2; which comprises admixing a silane of general formula $X_mSiR_{4-m}$, wherein R and X are as above defined, and $m$ is an integer having a value of 1 to 3, magnesium and tetrahydrofuran, heating the mixture to its refluxing temperature, gradually adding a solution of a dichlorophenylene compound of general formula Cl—R'—Cl, wherein R' is as above defined, in tetrahydrofuran, maintaining the temperature of the mixture at its refluxing temperature in order to effect reaction between said silane, dichlorophenylene, and magnesium to produce said bis-silylphenylene compound, and separating said compound.

4. A process for preparing 1,4-di-(dimethylethoxysilyl)benzene which comprises forming a mixture of dimethyldiethoxysilane, dichlorobenzene, and magnesium in tetrahydrofuran, and heating the mixture to effect reaction between said silane, dichlorobenzene and magnesium to produce said 1,4-di-(dimethylethoxysilyl)-benzene, and separating said compound.

5. A process for preparing 1,4-di-(dimethylchlorosilyl)-benzene which comprises forming a mixture of dimethyldichlorosilane, dichlorobenzene, and magnesium in tetrahydrofuran, and heating the mixture to effect reaction between said silane, dichlorobenzene and magnesium to produce said 1,4-di-(methylchlorosilyl)benzene, and separating said compound.

References Cited in the file of this patent

UNITED STATES PATENTS

| | | |
|---|---|---|
| 2,561,429 | Sveda | July 24, 1951 |
| 2,709,692 | Gainer | May 31, 1955 |
| 2,849,527 | Rogers et al. | Aug. 26, 1958 |
| 2,881,225 | Kaiser et al. | Apr. 7, 1959 |
| 2,894,012 | Ramsden et al. | July 7, 1959 |

OTHER REFERENCES

Clark et al.: "Jour. Am. Chem. Soc.," vol. 73 (August 1951), pages 3798–3803.

Sommer et al.: ibid, vol. 77 (May 1955), pages 2482–5.

Breed et al.: Wright Air Development Center Technical Report 57–143. "Development of Thermally Stable Silicon Containing Resins," May 1957, page 25.

Breed et al.: ibid, part II, February 1958, pp. 5, 6 and 19–22.